US005108242A

United States Patent [19]

Fisher

[11] Patent Number: 5,108,242

[45] Date of Patent: Apr. 28, 1992

[54] PAPER DRILLING APPARATUS

[76] Inventor: Charles B. Fisher, 1795 Hwy. 37, Blountville, Tenn. 37617

[21] Appl. No.: 742,321

[22] Filed: Aug. 8, 1991

[51] Int. Cl.[5] ............ B23B 41/00

[52] U.S. Cl. ............ 408/91; 269/91; 269/127; 269/307; 408/103

[58] Field of Search ............ 408/91, 103, 109, 62, 408/70, 72 R, 241 S; 269/91, 127, 128, 303, 307

[56] References Cited

U.S. PATENT DOCUMENTS

| | | | |
|---|---|---|---|
| 2,111,451 | 3/1938 | Koenig | 408/91 |
| 2,631,587 | 3/1953 | Sourse | 269/128 |
| 2,866,367 | 12/1958 | Wilkes | 269/91 |
| 3,280,660 | 10/1966 | Westra | 408/91 |

FOREIGN PATENT DOCUMENTS

| | | | |
|---|---|---|---|
| 76493 | 10/1953 | Denmark | 408/72 |

*Primary Examiner*—Daniel W. Howell
*Attorney, Agent, or Firm*—Leon Gilden

[57] ABSTRACT

A vertical support post mounts a drill head thereon, wherein the drill head is reciprocatable relative to the post to effect drilling of holes within paper stacks mounted upon a reciprocating table orthogonally oriented relative to the post positioned below the drill head. A reciprocating table is mounted upon a plurality of rollers, wherein the table may be positioned relative to the rollers utilizing a plurality of adjustable stop members operative in association with a stop guide mounted to a rear edge flange of the table. A clamp member is pivotally mounted over the table to secure a paper stack thereon for a drilling procedure.

7 Claims, 6 Drawing Sheets

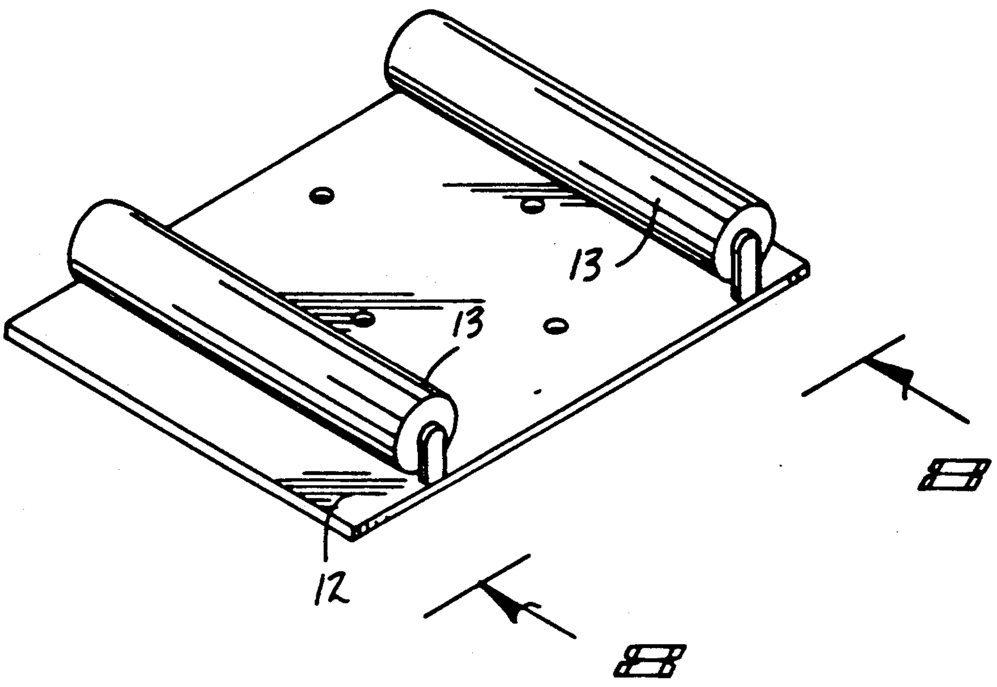
Fig 7
Fig 8
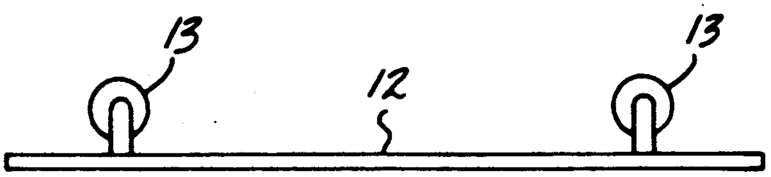

PAPER DRILLING APPARATUS

BACKGROUND OF THE INVENTION

1. Field of the Invention

The field of invention relates to paper drilling apparatus, and more particularly pertains to a new and improved paper drilling apparatus to effect the drilling of holes in a stacked sheet of paper.

2. Description of the Prior Art

Various drilling machines are utilized in the prior art to direct holes in a stack of paper for subsequent binding and the like of such paper products. Such apparatus is exemplified in U.S. Pat. No. 3,853,421 to Sickinger utilizing a stacked sheet oriented in a vertical orientation relative to a drilling procedure.

U.S. Pat. No. 3,718,404 to Grinnel, et al. wherein a stack of sheets to be bound is fed into a drilling apparatus positioned above a drill head and received within a slot of the machine to orient the paper stack for the drilling procedure.

U.S. Pat. No. 4,632,611 to Burns sets forth a paper drill of specific configuration for use in a drilling machine formed with an underlying support plate.

As such, it may be appreciated that there continues to be a need for a new and improved paper drilling apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of paper drilling apparatus now present in the prior art, the present invention provides a paper drilling apparatus wherein the same is arranged to mount and clamp a paper stack for a drilling procedure. As such, the general purpose of the present invention, which will be described subsequently in greater detail, is to provide a new and improved paper drilling apparatus which has all the advantages of the prior art paper drilling apparatus and none of the disadvantages.

To attain this, the present invention provides a vertical support post mounting a drill head thereon, wherein the drill head is reciprocatable relative to the post to effect drilling of holes within paper stacks mounted upon a reciprocating table orthogonally oriented relative to the post positioned below the drill head. A reciprocating table is mounted upon a plurality of rollers, wherein the table may be positioned relative to the rollers utilizing a plurality of adjustable stop members operative in association with a stop guide mounted to a rear edge flange of the table. A clamp member is pivotally mounted over the table to secure a paper stack thereon for a drilling procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved paper drilling apparatus which has all the advantages of the prior art paper drilling apparatus and none of the disadvantages.

It is another object of the present invention to provide a new and improved paper drilling apparatus which may be easily and efficiently manufactured and marketed.

It is a further object of the present invention to provide a new and improved paper drilling apparatus which is of a durable and reliable construction.

An even further object of the present invention is to provide a new and improved paper drilling apparatus which is susceptible of a low cost of manufacture with regard to both materials and labor, and which accordingly is then susceptible of low prices of sale to the consuming public, thereby making such paper drilling apparatus economically available to the buying public.

Still yet another object of the present invention is to provide a new and improved paper drilling apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is an isometric illustration of the stationary bed plate mounting the rollers thereon.

FIG. 8 is an orthographic view, taken along the lines 8—8 of FIG. 7 in the direction indicated by the arrows.

DESCRIPTION OF THE PREFERRED EMBODIMENT

Figure 1:
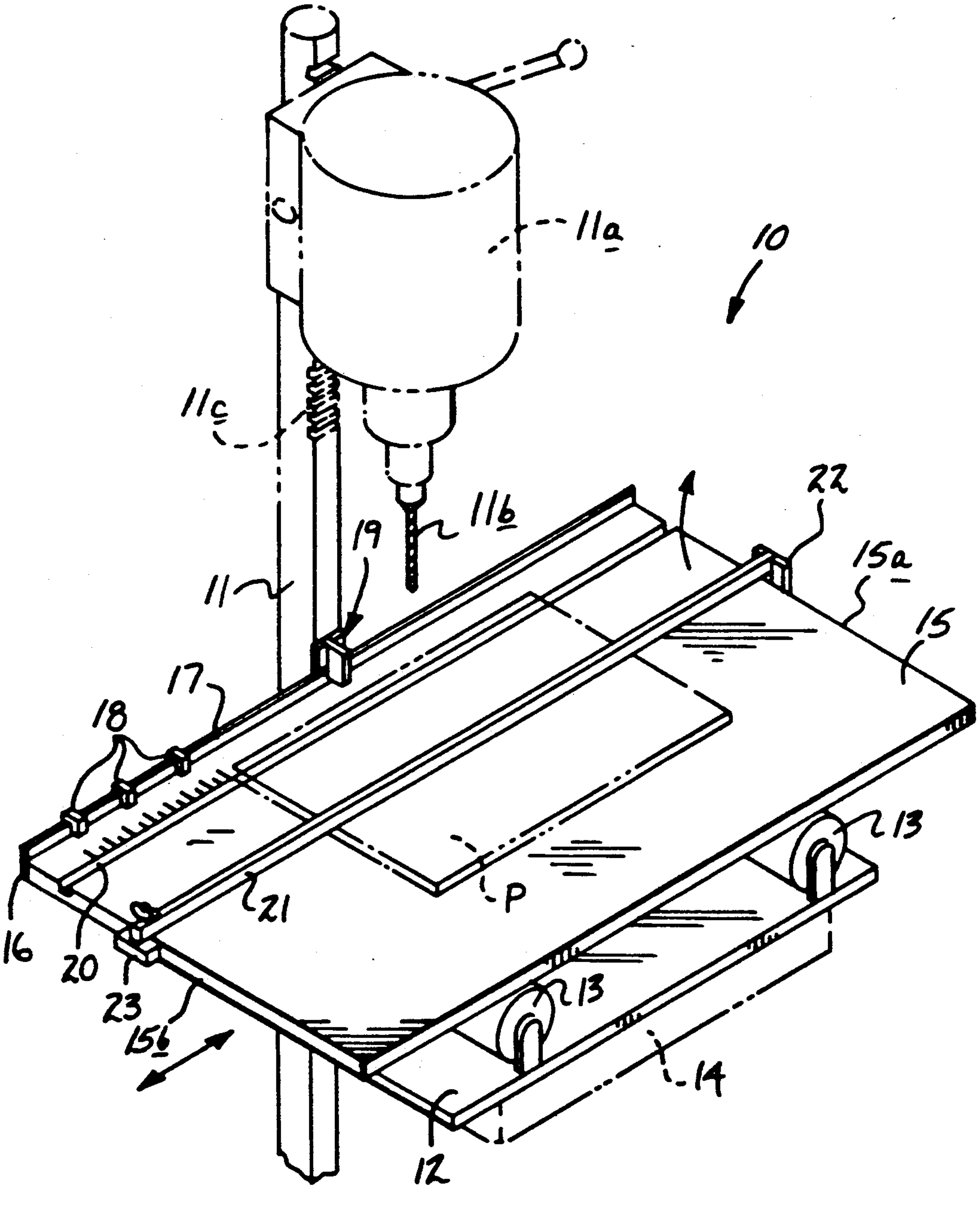
FIG. 1 is an isometric illustration of the instant invention.
Figure 2:
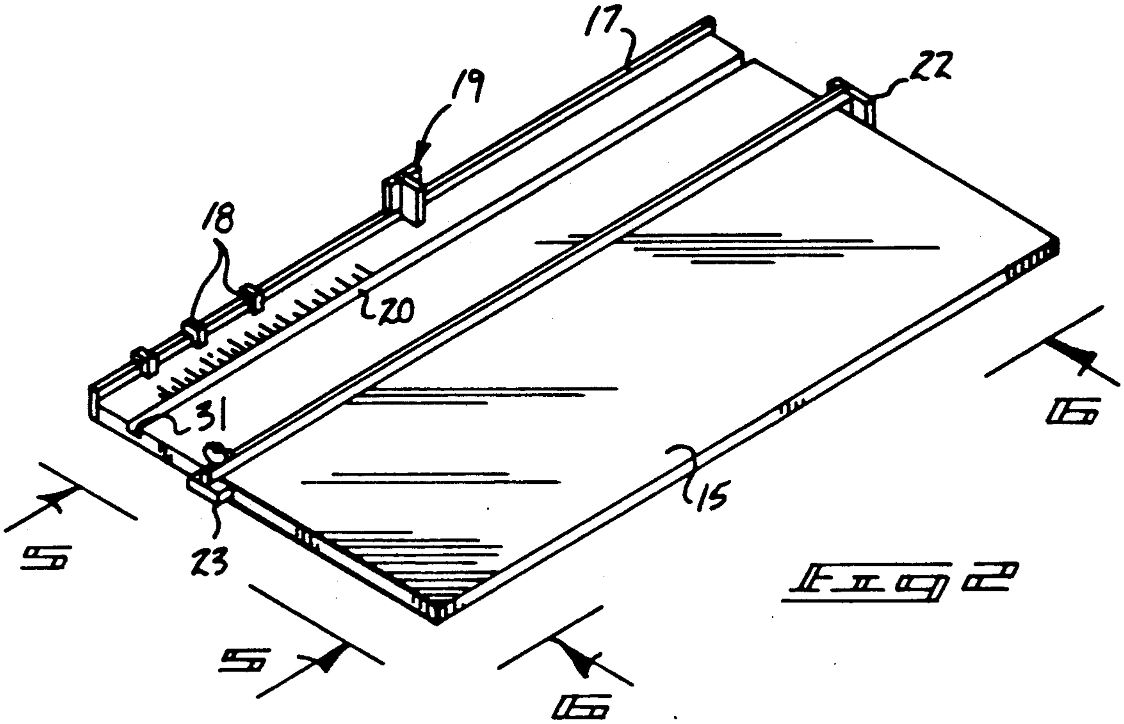
FIG. 2 is an isometric illustration of the reciprocating top plate utilized by the invention.
Figure 4:
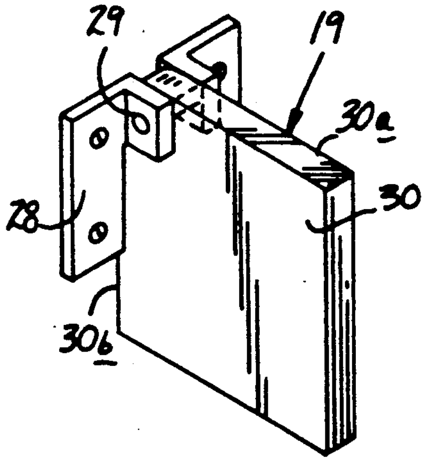
FIG. 4 is an isometric illustration of the stop guide utilized by the invention.
Figure 3:
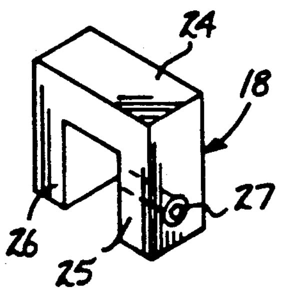
FIG. 3 is an isometric illustration of a movable stop member utilized by the invention.

With reference now to the drawings, and in particular to FIGS. 1 to 12 thereof, a new and improved paper drilling apparatus embodying the principles and concepts of the present invention and generally designated by the reference numeral 10 will be described.

More specifically, the paper drilling apparatus 10 of the instant invention essentially comprises a vertical support post 11, with the vertical support post fixedly and orthogonally mounting a stationary bed plate 12 thereto to afford face to the post, with the bed plate mounting a plurality of spaced parallel rollers 13 to a top surface of the bed plate 12. The rollers 13 permit manual reciprocation of a reciprocating top plate 15 that is mounted to the rollers 13 above the bed plate 12. The rollers permit manual manipulation of the reciprocating plate 15 or alternatively, a drive mechanism 14 may be utilized of any desired configuration to effect rotation of the rollers to provide for automated or mechanized displacement of the reciprocating top plate 15 in an orientation parallel to the bed plate 12.

The top plate 15 includes a top plate rear edge 16, with a respective first and second side edge 15*a* and 15*b* defining the rear and side edges of the reciprocating plate, with a guide flange 17 projecting orthogonally and above a top surface of the top plate 15, with the guide plate 17 mounting a plurality of "U" shaped movable stop members 18. A stop guide 19 mounted to the forward face of the support post 11 provides a pivotally oriented abutment surface for positioning of the stop members as required. With reference to the FIGS. 3 and 4, the stop members 18 each include a top web 14, including a forward leg 25 parallel and spaced from a rear leg 26. The forward leg 25 includes a locking rod 27 threadedly directed orthogonally through the forward leg 25 for engagement with the flange 17. In this manner, the stop members 18 are positionable about the guide flange 17 as desired, wherein the stop guide 19 includes a mounting flange 28 fixedly mounted to the forward face of the support post 11 above the flange 17. The mounting flange 28 includes a plurality of ears projecting forwardly of the mounting flange, with a pivot axle 29 pivotally mounting a guide plate 30. The pivot axle 29 is orthogonally directed through the guide plate 30 adjacent an intersection of a top and rear edge 30*a* and 30*b* respectively of the guide plate 30. The guide plate 30 is defined by a predetermined length to extend from the pivot axle 29 to the top surface of the top plate 15 to thereby provide an abutment surface, whereupon reciprocation of the top plate 15, selective ones of the stop members 19 are selectively arranged for abutment with the guide plate 30 to limit and properly position reciprocation of the top plate 15 relative to the drill bit 11*b* of an associated drill motor 11*a* that is reciprocatably mounted to the vertical support post 11 about a gear rack 11*c*.

Figure 5:
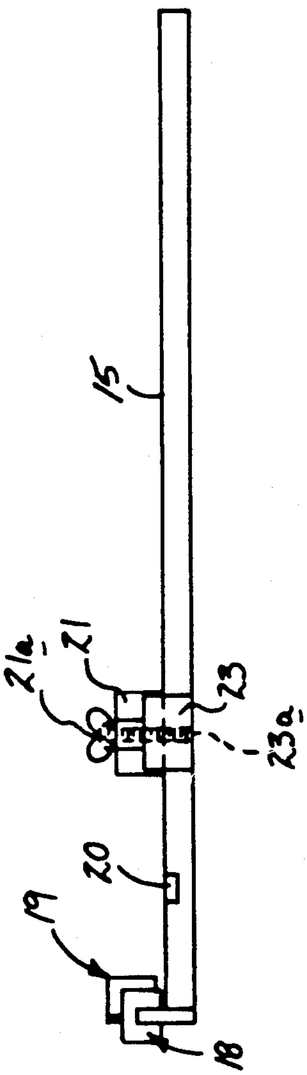
FIG. 5 is an orthographic end view of the reciprocating top plate.
Figure 6:
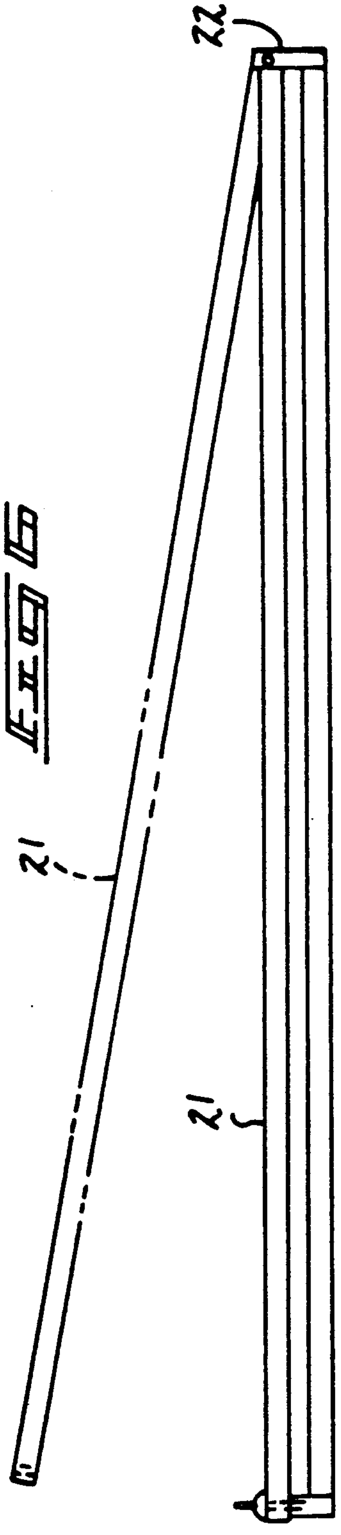
FIG. 6 is an orthographic side view of the reciprocating top plate.
Figure 9:
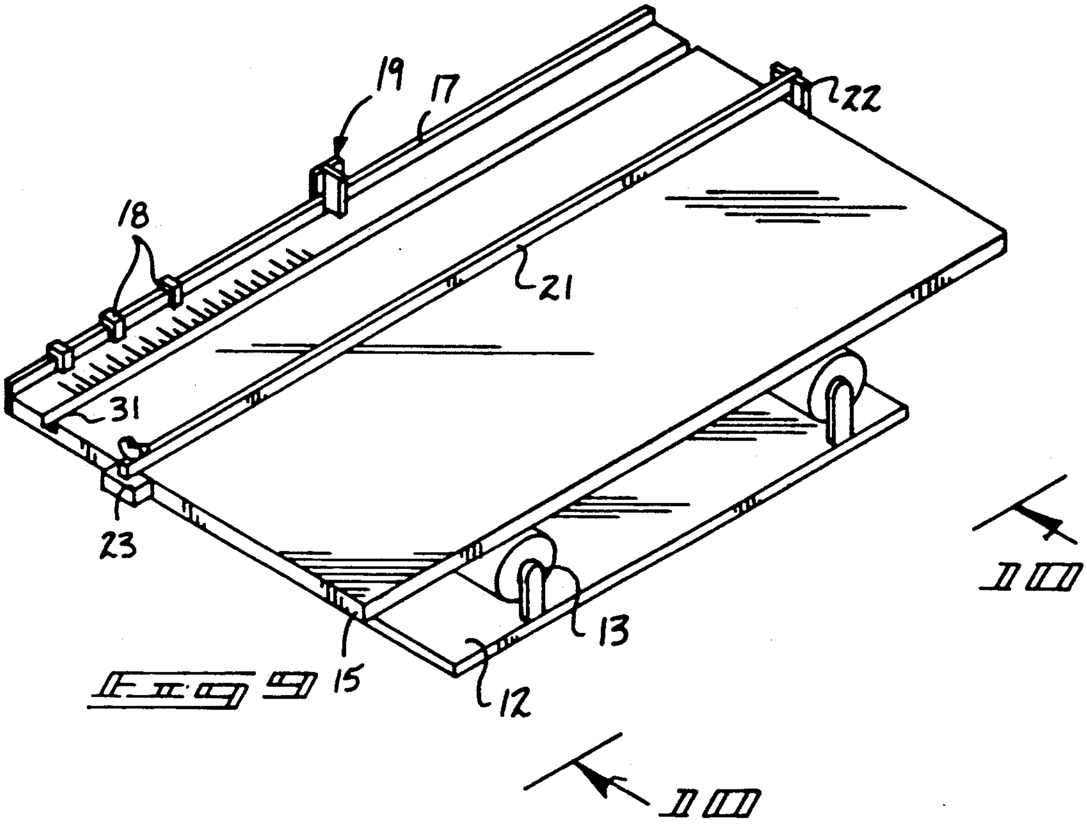
FIG. 9 is an isometric illustration of the stationary bed plate and reciprocating top plate.
Figure 10:
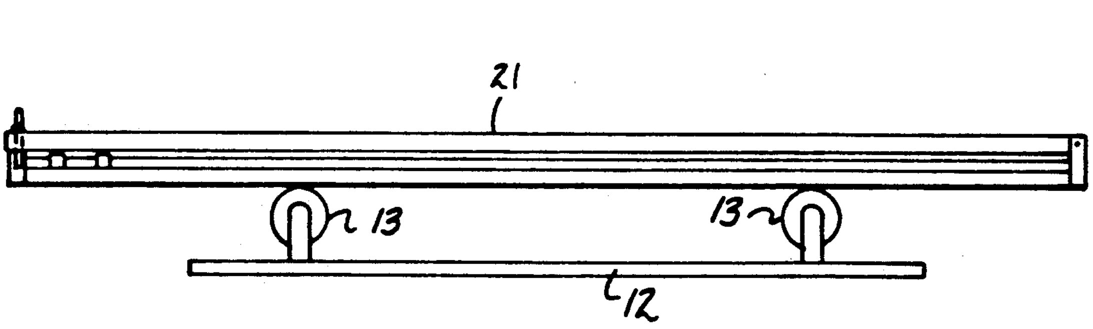
FIG. 10 is an orthographic view, taken along the lines 10—10 of FIG. 9 in the direction indicated by the arrows.

A graduated guide back-up strip 20 is positioned within a groove 31 that includes an array of gradations adjacent thereto for proper orientation of a paper stack "P", as illustrated in FIG. 1 for example. When the paper stack "P" is positioned as desired, a clamp bar 21 is pivotally mounted at its rear end at a pivot mount 22 mounted to the first edge 15*a*, wherein a locking member 23 mounted to the second edge 15*b* receives the forward end of the clamp bar 21. Reference to FIG. 5 illustrates the locking member 23 including an internally threaded bore 23*a* cooperative with an externally threaded lock rod 21*a* orthogonally projecting through the forward terminal end of the clamp bar 21 and received within the internally threaded bore 23*a* to clamp a paper stack between the clamp bar 21 and the top surface of the top plate 15.

Figure 11:
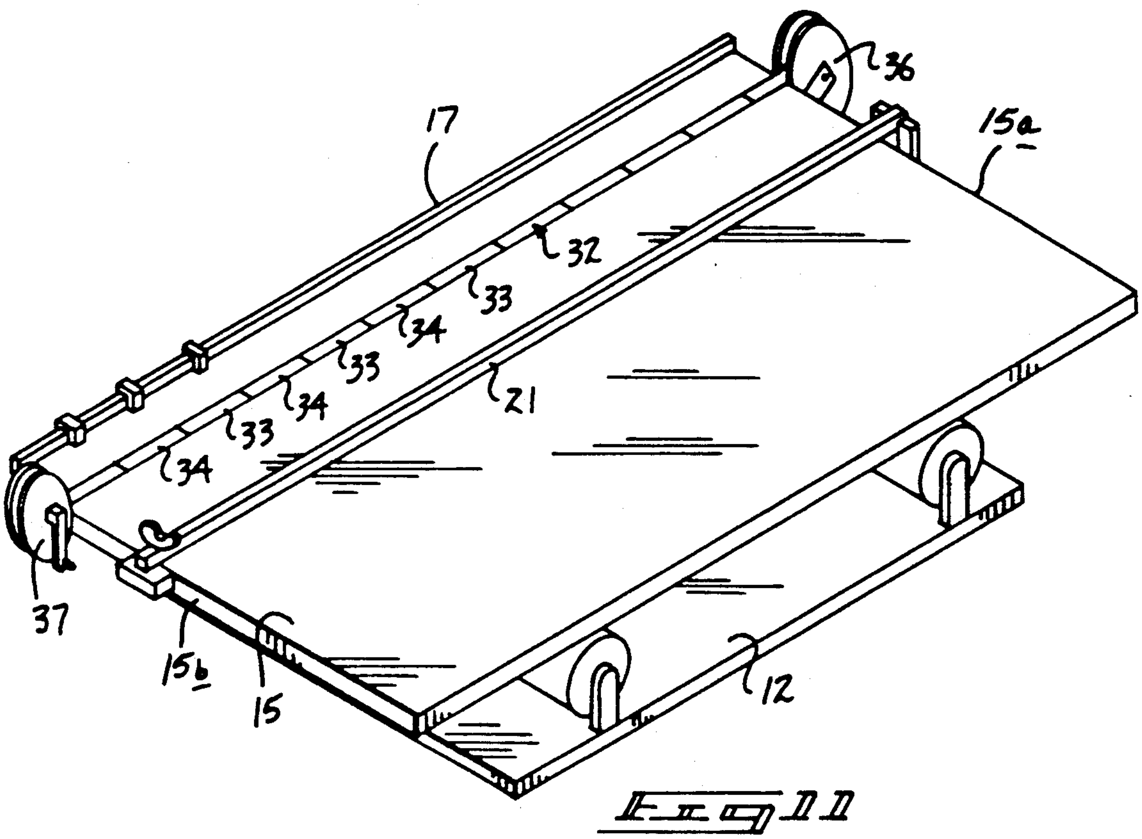
FIG. 11 is an isometric illustration of the reciprocating top plate utilizing a modified back-up strip for receiving the drill.
Figure 12:
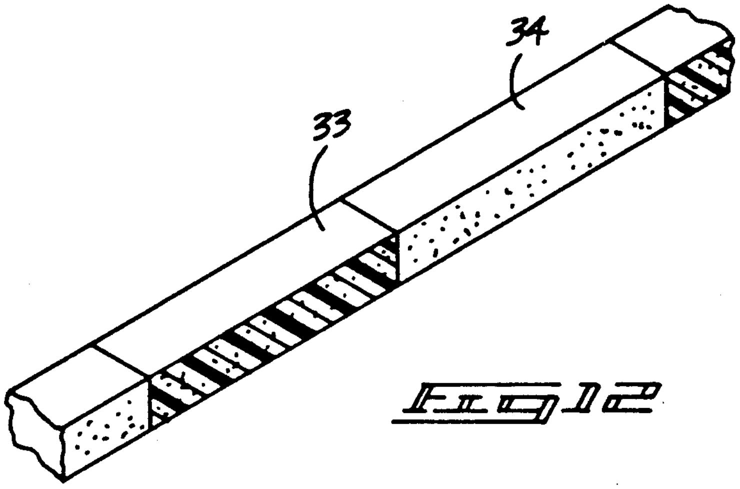
FIG. 12 is an isometric enlarged partial sectional view of the modified back-up strip, as utilized in FIG. 11.

Reference to FIGS. 11 and 12 illustrate the use of a modified back-up pad 32 positioned within the groove 31. The back-up pad 32 includes a plurality of graduated sections defined by alternating first and second sections 33 and 34 respectively. The first sections 33 define a resilient pad member of a generally rectangular parallelepiped configuration to be complementarily received within the groove 31, wherein the second sections 34 include a lubricant impregnated pad structure to effect cleaning and lubrication of the drill bit 11*b* when projected into the second section 34. A supply reel 36 is mounted in alignment with the groove 31 to the first side edge 15*a*, wherein a take-up reel 37 is mounted to the second edge 15*b* in alignment with the groove 31 to permit the replenishment of the back-up pad 32 when directed through the groove 31.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A paper drilling apparatus, comprising, a vertical support post, the vertical support post including a forward vertical wall, the forward vertical wall reciprocatably mounting a drill member thereon, the drill member including a drill bit, the drill bit arranged parallel to the forward vertical wall, and a stationary bed plate fixedly and orthogonally mounted to the vertical support post and the forward vertical wall below the drill bit, and a reciprocating top plate reciprocatingly mounted relative to the stationary bed plate and positioned above the stationary bed plate in a parallel spaced relationship, and roller means mounted on the bed plate for reciprocatingly mounting the top plate relative to the bed plate, and the top plate including a top plate forward edge, a top plate rear edge, a top plate first side edge, and a top plate second side edge, wherein the top plate first side edge and the top plate second side edges are arranged in a parallel relationship, and the first side edge including a pivot mount, and the second side edge including a locking member, and a clamp bar pivotally mounted to the pivot mount and including lock means for locking the clamp bar to the locking member.

2. An apparatus as set forth in claim 1 wherein the lock means includes an externally threaded lock rod orthogonally directed through the clamp bar at a forward terminal end of the clamp bar spaced from the pivot mount, and the locking member including an internally threaded bore, wherein the internally threaded bore is coaxially aligned with the lock rod when the clamp bar is in contiguous communication with the locking member in a lowered position.

3. An apparatus as set forth in claim 2 wherein the top plate rear edge includes a flange member coextensive with the top plate rear edge and arranged in an orthogonal relationship relative to a top surface of the top plate and projecting above the top surface of the top plate, and the guide flange including a plurality of "U" shaped movable stop members selectively positionable along the guide flange, and a stop guide pivotally mounted to the forward vertical wall of the support post for selective engagement with at least one of the stop members upon reciprocation of the top plate relative to the bed plate.

4. An apparatus as set forth in claim 3 wherein each stop member includes a forward leg spaced from and parallel a rear leg, including a top web orthogonally oriented relative to the forward leg and the rear leg, wherein the forward leg includes a locking rod orthogonally directed through the forward leg for engagement with the guide flange, and the stop guide including a mounting flange fixedly mounted to the forward vertical wall adjacent to and above the guide flange, and the mounting flange including a plurality of axle webs extending forwardly and orthogonally relative to the mounting flange, with a pivot axle directed through the axle webs, and the guide plate mounted to the pivot axle between the axle webs, and the guide plate including a guide plate top edge and a guide plate rear edge, wherein the pivot axle is directed through the guide plate adjacent a top edge and the rear edge, and the guide plate extends downwardly from the pivot axle adjacent to the top plate top surface adjacent the guide flange when in a lowered position for engagement of at least one of said stop members.

5. An apparatus as set forth in claim 4 including a groove extending orthogonally between the top plate first side edge and the top plate second side edge between the guide flange and the clamp bar, the groove including a back-up pad coextensively contained within the groove.

6. An apparatus as set forth in claim 5 wherein the back-up pad includes a plurality of first sections and a plurality of second sections, wherein the first and second sections are arranged in an alternating relationship throughout the back-up pad, and the first section is formed as a resilient pad, and the second section is formed as a resilient pad including a lubricant impregnated coextensively throughout the second to provide lubrication and cleaning of the drill bit when directed into the second section.

7. An apparatus as set forth in claim 6 wherein the back-up pad includes a supply reel, with the supply reel mounted adjacent the groove fixedly mounted to the first side edge of the top plate, wherein the supply reel includes a back-up pad supply portion wound thereabout, and further including a take-up reel fixedly and rotatably mounted to the top plate on the first side edge of the top plate, wherein the take-up reel includes a crank handle to effect selective winding of the back-up pad on the take-up reel when directed from the supply reel through the groove.

* * * * *